United States Patent
Rao et al.

(10) Patent No.: US 11,252,234 B1
(45) Date of Patent: Feb. 15, 2022

(54) CONTAINERIZED GATEWAYS AND EXPORTS FOR DISTRIBUTED FILE SYSTEMS

(71) Applicant: Red Hat, Inc., Raleigh, NC (US)

(72) Inventors: Varsha Rao, Bangalore (IN); Patrick Donnelly, Sunnyvale, CA (US); Ramana Krisna Venkatesh Raja, Bangalore (IN); Jeffrey Layton, Wake Forest, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/125,236

(22) Filed: Dec. 17, 2020

(51) Int. Cl.
*H04L 29/08* (2006.01)

(52) U.S. Cl.
CPC .......... *H04L 67/1097* (2013.01); *H04L 67/06* (2013.01); *H04L 67/1014* (2013.01)

(58) Field of Classification Search
CPC .. H04L 67/1097; H04L 67/06; H04L 67/1014
See application file for complete search history.

(56) References Cited

U.S. PATENT DOCUMENTS

| | | | |
|---|---|---|---|
| 8,180,747 B2 * | 5/2012 | Marinkovic | G06F 16/1827 707/704 |
| 8,655,851 B2 | 2/2014 | Patwardhan et al. | |
| 8,793,343 B1 * | 7/2014 | Sorenson, III | G06F 16/183 709/219 |
| 9,923,958 B1 | 3/2018 | Glover et al. | |
| 10,303,663 B1 * | 5/2019 | Kinney, Jr. | G06F 16/1873 |
| 10,938,892 B1 * | 3/2021 | Puvvada | H04L 67/1008 |
| 2013/0103787 A1 * | 4/2013 | Glover | G06F 9/5083 709/217 |
| 2017/0257432 A1 * | 9/2017 | Fu | H04L 67/2823 |
| 2017/0302589 A1 * | 10/2017 | Leafe | H04L 63/0892 |
| 2018/0157752 A1 * | 6/2018 | Arikatla | G06F 16/182 |
| 2018/0203873 A1 * | 7/2018 | Yuzawa | G06F 16/176 |
| 2018/0375936 A1 * | 12/2018 | Chirammal | H04L 67/1097 |
| 2019/0332683 A1 * | 10/2019 | Thummala | H04L 63/102 |

(Continued)

FOREIGN PATENT DOCUMENTS

CN 109218386 1/2019

OTHER PUBLICATIONS

A Guide to the IBM Clustered Network File System; Chavis, et al.; ibm/com/redbooks; Redpaper; Nov. 2010; http://www.redbooks.ibm.com/redpapers/pdfs/redp4400.pdf (82 pages).

(Continued)

*Primary Examiner* — Jonathan A Bui
(74) *Attorney, Agent, or Firm* — K&L Gates LLP

(57) ABSTRACT

Systems and method for improved creation and management of distributed file systems are provided. In one embodiment, a method is provided that includes creating a plurality of containers within a cloud computing environment and executing, within the plurality of containers, a plurality of gateways for a distributed file system. Exports of the distributed file system may be assigned to a subset of the plurality of gateways. The exports may correspond to an exclusive subset of the distributed file system. The method may also include responding to requests to access exports of the distributed file system using containers executing gateways assigned to corresponding exports of the distributed file system.

20 Claims, 7 Drawing Sheets

(56) References Cited

U.S. PATENT DOCUMENTS

| | | | |
|---|---|---|---|
| 2020/0026810 A1 | 1/2020 | Subramaniam et al. | |
| 2020/0364189 A1* | 11/2020 | Lee | G06F 21/64 |
| 2021/0019063 A1* | 1/2021 | Lee | G06F 3/0653 |
| 2021/0019190 A1* | 1/2021 | Punadikar | G06F 9/547 |
| 2021/0034397 A1* | 2/2021 | Denny | H04L 63/168 |

OTHER PUBLICATIONS

A Load Balancing Framework for Clustered Storage System; Kunkle et al.; Northeastern Unversity and NetApp Inc.; https://atg.netapp.com/wp-content/uploads/2008/12/load-balancing-hipc08.pdf (15 pages).

C2: Adaptive Load Balancing for Metadata Server Cluster in Cloud-scale File Systems; Xu et al.; Data Storage Institute and Nanyang Technological Universit; https://oar.a-star.edu.sg/jspui/bitstream/123456789/1408/3/C2%20-%20daptive%20Load%20Balancing%20for%20Metadata%20Server%20Cluster%20in%20EB-scale%20File%20Systems.pdf (15 pages).

Configuring and Managing High Availability Clusters; Red Hat Enterprise Lunix 8; Configuring and managing the Red Hat High Availability Add-On; 2020; https://access.redhat.com/documentation/en-us/red_hat_enterprise_linux/8/html-single/configuring_and_managing_high_availability_clusters/index (226 pages).

Gluster/glusterfs; https://github.com/gluster/glusterfs/blob/master/extras/ganesha/scripts/create-export-ganesha.sh; 2020 GitHub, Inc.; retrieved Dec. 17, 2020 (3 pages).

NFS in NetApp ONTAP, Best Practices and Implementation Guide; Pariso, Jul. 2020; https://www.netapp.com/us/media/tr-4067.pdfl retrieved Dec. 17, 2020 (163 pages).

What an HA pair is; 1994-2014, NetApp, Inc.; Nov. 2014; https://library.netapp.com/ecmdocs/ECMP1552961/html/GUID-14E3CE93-AD0F-4F35-B959-282EEA15E597.html; retrieved Dec. 17, 2020 (one page).

Panasas PanFs 8: Architectural Overview; 2020 Panasas, Inc.; https://www.panasas.com/wp-content/uploads/2020/08/Panasas_WP_PanFS-8%E2%80%93Architectural_Overview_FINAL_2020-08-04.pdf; retrieved Dec. 17, 2020; (15 pages).

\* cited by examiner

CONTAINERIZED GATEWAYS AND EXPORTS FOR DISTRIBUTED FILE SYSTEMS

BACKGROUND

When executing, computer programs and computing processes may often require access to data stored in long-term storage. Such data may be stored using various file system technologies. For example, data may be stored in databases implementing particular file systems. Certain implementations include localized file systems executing on a single computing device and distributed file systems executing on multiple computing devices.

SUMMARY

The present disclosure presents new and innovative systems and methods for implementing and managing distributed file systems. In one aspect, a method is provided that includes creating a plurality of containers within a cloud computing environment and executing, within the plurality of containers, a plurality of gateways for a distributed file system. Exports of the distributed file system may be assigned to a subset of the plurality of gateways. The exports may correspond to an exclusive subset of the distributed file system. The method may also include responding to requests to access exports of the distributed file system using containers executing gateways assigned to corresponding exports of the distributed file system.

In a second aspect, a system is provided that includes at least one memory and at least one processor configured to implement a cloud computing environment. Multiple containers may execute within the cloud computing environment and multiple gateways for a distributed file system may execute within the plurality of containers. A subset of the plurality of containers may be assigned to exports of the distributed file system. The exports may correspond to an exclusive subset of the distributed file system. Requests to access exports of the distributed file system may be responded to using containers executing gateways assigned to corresponding exports of the distributed file system.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Different types of file systems may be preferable for use in different types of computing systems. In one specific example, stateful protocols may be used by client devices to access and interact with gateways providing access to the distributed file system. For instance, a distributed file system may be implemented by a network file system (NFS) protocol, such as the NFSv4 protocol. Typically, such distributed file systems are implemented by creating and configuring gateways for the distributed file system on particular, dedicated computing hardware (or dedicated portions of computing hardware). These gateways may be initialized and assigned to handle requests for a particular portion of the distributed file system.

However, once a configuration for a distributed file system is set, it may typically be difficult to expand or otherwise alter the gateways assigned to the distributed file system. In particular, manual intervention may typically be required, with an administrator necessary to recognize bottlenecks, approve reassignments, and/or add gateways to the distributed file system. This can result in performance delays, as particular gateways field larger numbers of requests than others, increasing response latency for the particular gateways. Furthermore, because the gateways may typically be implemented by discrete, assigned computing hardware, it may be difficult both to assign greater computing resources to respond to increased request loads and to add new gateways to the distributed file system. Therefore, there exists a need to enable both computing resource allocation expansion and control for distributed file systems ("horizontal scaling") and to enable gateways to be easily added to and removed from distributed file systems ("vertical scaling").

One solution to this problem is to use one or more containers within a cloud computing environment to implement gateways for a distributed file system. In particular, gateways may be configured to receive and process requests to access subsets of the distributed file system (e.g., requests to access "exports" of the distributed file system). Gateways for the distributed file system may be implemented by one or more containers. Individual containers may be assigned to respond to one or more exports associated with the gateways. Distributing the workload for the gateways in this manner may enable both vertical and horizontal scaling of the distributed file system, allowing both additional containers to be assigned to process particular exports of the distributed file system and gateways to be added to the distributed file system as needed (e.g., to address geographical distribution of computing processes accessing the distributed file system).

Figure 1:
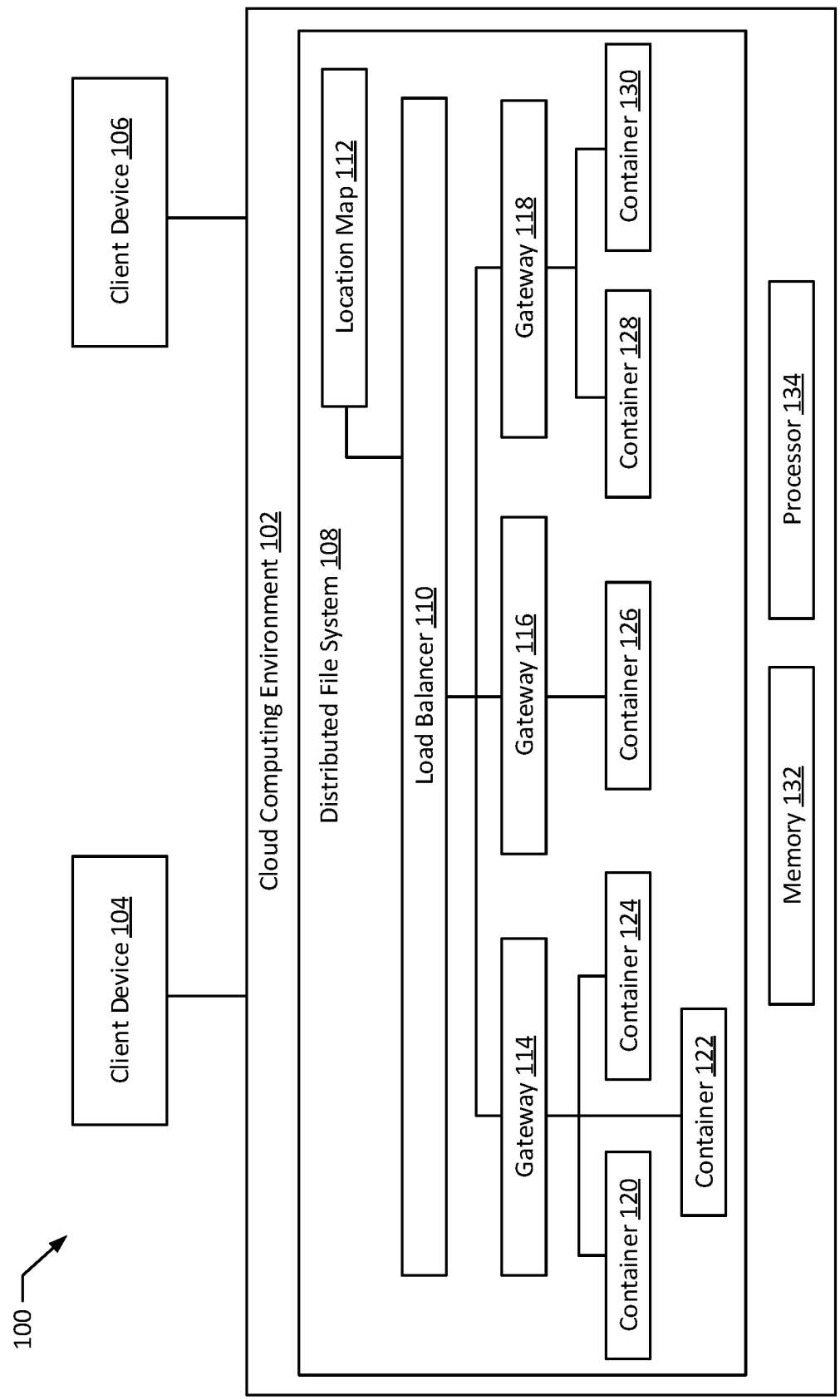
FIG. 1 illustrates a system for distributed file system management according to an exemplary embodiment of the present disclosure.

FIG. 1 illustrates a system 100 for distributed file system management according to an exemplary embodiment of the present disclosure. The system 100 may be configured to provide a distributed file system 100 within a cloud computing environment 102. The system 100 includes a cloud computing environment 102 communicating with two client devices 104, 106. The cloud computing environment 102 may be configured to execute various computing processes. For example, the cloud computing environment 102 may be implemented by multiple computing devices, including multiple computing devices in different locations. The cloud computing environment 102 may be configured to execute various computing processes using the multiple computing devices. For example, the cloud computing environment 102 may receive one or more requests from the client devices 104, 106 to execute particular computing processes. In certain implementations, the cloud computing environment 102 may execute the computing processes within containers and/or within virtual machines. For example, the cloud computing environment 102 may be implemented at least in part a Red Hat OpenShift® environment.

The cloud computing environment 102 contains a distributed file system 108. The distributed file system 108 may store data for use by computing processes executing on the cloud computing environment 102. For example, while executing, the computing processes (e.g., containers or virtual machines implementing the computing processes) may access the distributed file system 108 to read and/or write data within the distributed file system 108. In particular, the distributed file system 108 may be accessible via one or more gateways 114, 116, 118 contained within the distributed file system 108. For example, the distributed file system 108 may be implemented as an NFS file system (e.g., an NFSv4 file system) and the gateways 114, 116, 118 may be implemented as NFS gateways or similar (e.g., NFS daemons, NFS nodes, NFS clusters). The gateways 114, 116, 118 may be configured to receive and process requests to access data stored within the distributed file system 108 and/or to store or update data within the distributed file system 108. Each of the gateways 114, 116, 118 may be assigned to process requests for an exclusive subset of the distributed file system 108. For example, the gateways 114, 116, 118 may be assigned particular exports of the distributed file system 108, as discussed further below.

In practice, each of the gateways 114, 116, 118 may be implemented using containerization. In particular, each of the gateways 114, 116, 118 may be implemented by one or more containers 120, 122, 124, 126, 128, 130 created by the cloud computing environment 102. For example, the gateways 114, 116, 118 may be implemented as clusters of containers 120, 122, 124, 126, 128, 130 (e.g., "gateway clusters"). In particular, each of the containers 120, 122, 124, 126, 128, 130 that implement a particular gateway 114, 116, 118 may be assigned to respond to requests for different portions of the distributed file system 108 assigned to the corresponding gateway 114, 116, 118. For example, the containers 120, 122, 124, 126, 128, 130 may be assigned to respond to requests for one or more exports of the distributed file system 108.

The distributed file system 108 also includes a location map 112. The location map 112 may store associations between certain portions of the distributed file system 108 (e.g., certain exports of the distributed file system 108) gateways 114, 116, 118, such as addresses to which requests can be sent. In certain instances, each container 120, 122, 124, 126, 128, 130 may be assigned to manage all exports assigned to a corresponding gateway 114, 116, 118. In such instances, the location map 112 may store mappings between particular exports and an identifier of the gateway 114, 116, 118 (e.g., an address for the gateway 114, 116, 118). In additional or alternative implementations, different containers 120, 122, 124, 126, 128, 130 may manage different exports assigned to the gateways 114, 116, 118 and the location map 112 may store mappings between particular exports and an identifier of the container 120, 122, 124, 126, 128, 130 implementing the export (e.g., an address for the container 120, 122, 124, 126, 128, 130). The location map 112 is discussed in greater detail below in connection with FIG. 2.

The gateways 114, 116, 118 may be created and updated by a load balancer 110 of the distributed file system 108. The load balancer 110 may be responsible for creating new gateways 114, 116, 118, removing existing gateways 114, 116, 118, adding new containers 120, 122, 124, 126, 128, 130 to particular gateways 114, 116, 118, and/or removing certain containers 120, 122, 124, 126, 128, 130 from particular gateways 114, 116, 118. In particular, the load balancer 110 may be configured to add or remove gateways 114, 116, 118 and/or containers 120, 122, 124, 126, 128, 130 to the distributed file system 108 based on current workloads for existing gateways 114, 116, 118 and/or containers 120, 122, 124, 126, 128. For example, if a particular container 122 of a gateway 114 is experiencing substantially higher request loads than other containers 120, 124 of the gateway 114, the load balancer 110 may add a new container to the gateway 114. Additionally or alternatively, the load balancer 110 may reassign all or part of the exports assigned to the container 122 to the other containers 120, 124. In additional or alternative implementations, if a single container 126 implementing a gateway 116 experiences requests greater than a particular threshold, the load balancer 110 may create a new container to implement the gateway 116 and may assign a portion of the exports for the gateway 116 to the new container. As a further example, if a request is received for a portion of the distributed file system 108 that is not assigned to a gateway, or that is assigned to a gateway implemented by computing devices located far away from a requesting computing device, the load balancer 110 may create a new gateway executing within a new corresponding container for the distributed file system 108 and may assign the requested portion of the distributed file system 108 to the new gateway. Gateway and container scaling are discussed in greater detail below in connection with FIGS. 3A-3B.

As explained further below, adding and removing gateways and containers to the distributed file system 108 may improve both resource utilization by the distributed file system 108 and response latency, as computing resources (and corresponding containers) are assigned to portions of the distributed file system and corresponding gateways that are experiencing the highest request loads. Furthermore, adding additional gateways may improve colocation of the distributed file system 108 with requesting computing processes. Furthermore, using multiple containers to implement gateway clusters improves reliability of the gateway clusters. For example, having multiple containers in a cluster assigned to manage all or part of the exports of a particular gateway may enable improved uptime if one of the containers fails, as each container in the cluster can participate in recovery of the exports (e.g., through coordinated grace periods).

In practice, the cloud computing environment 102 may communicate with the client devices 104, 106 via one or more networks. Furthermore, multiple computing devices implementing the cloud computing environment 102 may communicate with one another via one or more networks. In particular, communications with the one or more may utilize one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, L1 and/or a global network (e.g., the Internet).

The cloud computing environment 102 includes a memory 132 and a processor 134. The memory 132 and the processor may implement one or more aspects of the cloud computing environment 102. For example, the memory 132 and the processor 134 may implement the distributed file system 108 and corresponding containers 120, 122, 124, 126, 128, 130. In practice, as explained above, the cloud computing environment 102 may be implemented by multiple computing devices. In such instances, the memory 132 and the processor 134 may be implemented by multiple memories and/or multiple processors of the multiple computing devices implementing the cloud computing environment 102. Furthermore, although not depicted, the client devices 104, 106 may similarly contain memories and/or processors configured to implement one or more operational features of the client devices 104, 106.

Figure 2:
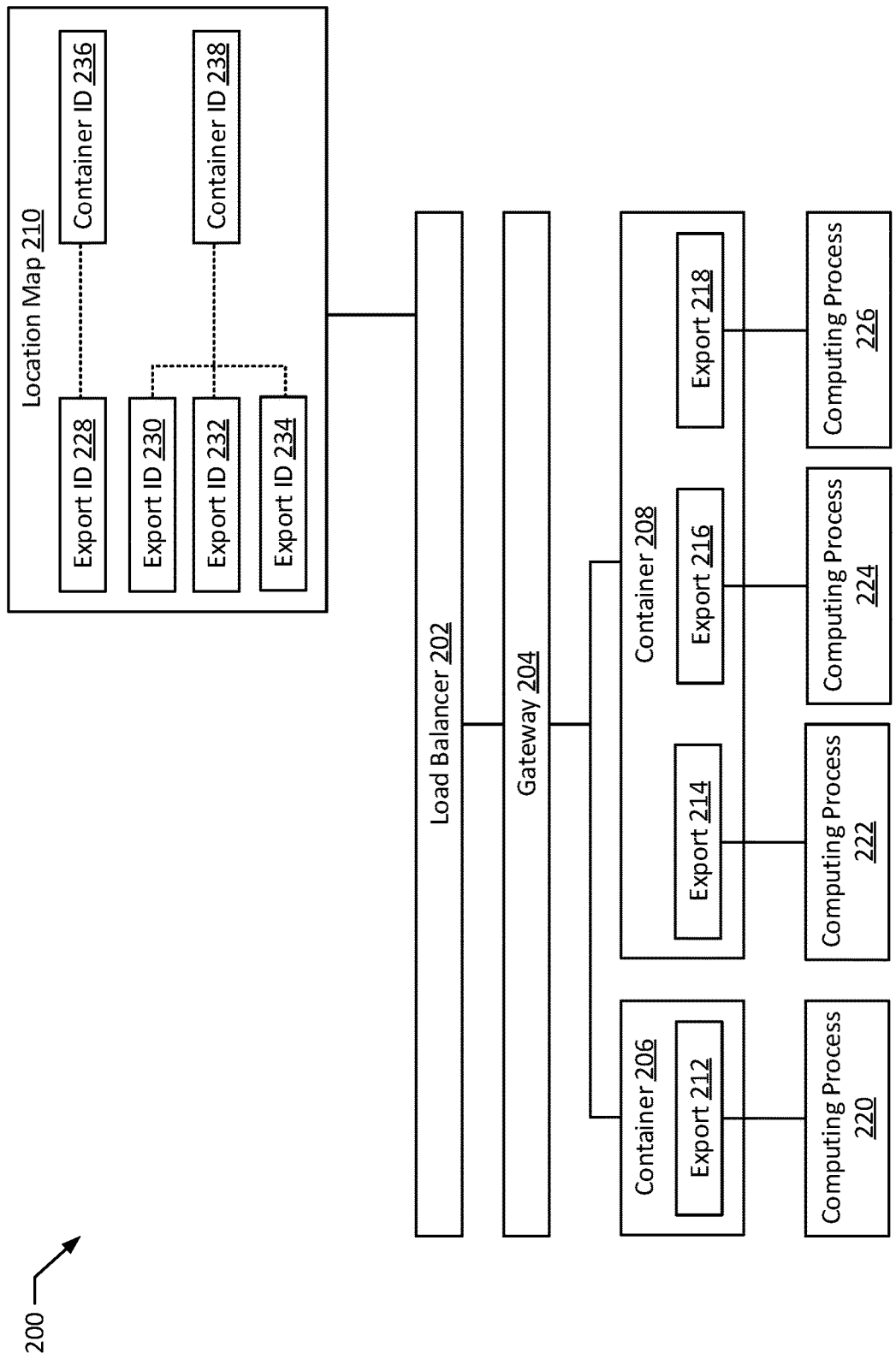
FIG. 2 illustrates a file system management scenario according to an exemplary embodiment of the present disclosure.

FIG. 2 illustrates a file system management scenario 200 according to an exemplary embodiment of the present disclosure. The file management scenario 200 may be an exemplary implementation of the distributed file system 108 implemented by the cloud computing environment 102. The file system management scenario 200 includes a load balancer 202, which may be an exemplary implementation of the load balancer 110, a location map 210, which may be an exemplary implementation of the location map 112, and a gateway 204, which may be an exemplary implementation of one of the gateways 114, 116, 118.

The gateway 204 is implemented by two containers 206, 208. Each container 206 is responsible for implementing one or more exports 212, 214, 216, 218. Each of the exports 212, 214, 216, 218 may correspond to a particular, exclusive subsets of the distributed file system 108. For example, the exports 212, 214, 216, 218 may correspond to particular subtrees and/or subdomains of the distributed file system 108. The exports 212, 214, 216, 218 may serve as an access point for a shared subdirectory of the distributed file system 108 (e.g., a subdirectory available for access by computing processes). In particular, the exports 212, 214, 216, 218 may contain or access one or more copies of data stored within the shared subdirectory. In certain instances, the exports 212, 214, 216, 218 may provide access to one or more child directories of an assigned subdirectory, such as all child directories that have not themselves been assigned to a particular export 212, 214, 216, 218. In certain implementations, the exports 212, 214, 216, 218 may be implemented as NFS exports for the distributed file system 108.

Each of the exports 212, 214, 216, 218 may correspond to one or more computing processes 220, 222, 224, 226. For example, the computing processes 220, 222, 224, 226 may be executing and accessing (e.g., reading or writing) data stored within the exports 212, 214, 216, 218 (e.g., data stored within corresponding portions of the distributed file system 108). In response to requests received from the computing processes 220, 222, 224, 226, the containers 206, 208 may provide copies of data and/or may update data stored within the corresponding portions of the distributed file system 108.

The computing processes 220, 222, 224, 226 may be configured to transmit requests directly to the containers 206, 208 implementing the exports 212, 214, 216, 218. For example, the location map 210 may store information regarding which exports 212, 214, 216, 218 are assigned to which containers 206, 208. In particular, the location map 210 may store export identifiers 228, 230, 232, 234 associated with container identifiers 236, 238. The export identifiers 228, 230, 232, 234 may identify a particular portion of the distributed file system 108 (e.g., a particular subtree or particular subdirectory) corresponding to an export 212, 214, 216, 218. The container identifier 236, 238 may identify the containers 206, 208 implementing the exports 212, 214, 216, 218. Additionally or alternatively, the container identifiers 236, 238 may identify an address for the containers 206, 208 to which requests to access the exports 212, 214, 216, 218 may be transmitted. As depicted, the export identifier 228 may correspond to the exports 212, the export identifier 230 may correspond to the exports 214, the export identifier 232 may correspond to the export 216, and the export identifier 234 may correspond to the export 218. As further depicted, the container identifier 236 may correspond to the container 206 and the container identifier 238 may correspond to the container 208.

To initially request data from the distributed file system 108, the computing processes 220, 222, 224, 226 may query the location map 210 for corresponding container identifier 236, 238. The computing processes 220, 222, 224, 226 may then transmit the request directly to the container 206, 208 based on the container identifier 236, 238. In certain implementations, the container identifier 236, 238 may be stored and future requests to access the exports 212, 214, 216, 218 may be transmitted directly to the containers 206, 208 using the previously-stored container identifier 236, 238.

The load balancer 202 may be responsible for creating the containers 206, 208 that implement the gateway 204. For example, the load balancer 202 may be configured to create the containers 206, 208 and to assign the exports 212, 214, 216, 218 managed by each of the containers 206, 208. The load balancer 202 may also monitor operating conditions for the containers 206, 208, such as a number of requests fulfilled by the containers 206, 208 and/or in amounts of computing resources utilized by the containers 206, 208. In certain instances, the load balancer 202 may create new containers 206, 208 and/or may adjust the allocation of exports 212, 214, 216, 218 between the containers 206, 208.

Figure 3A:
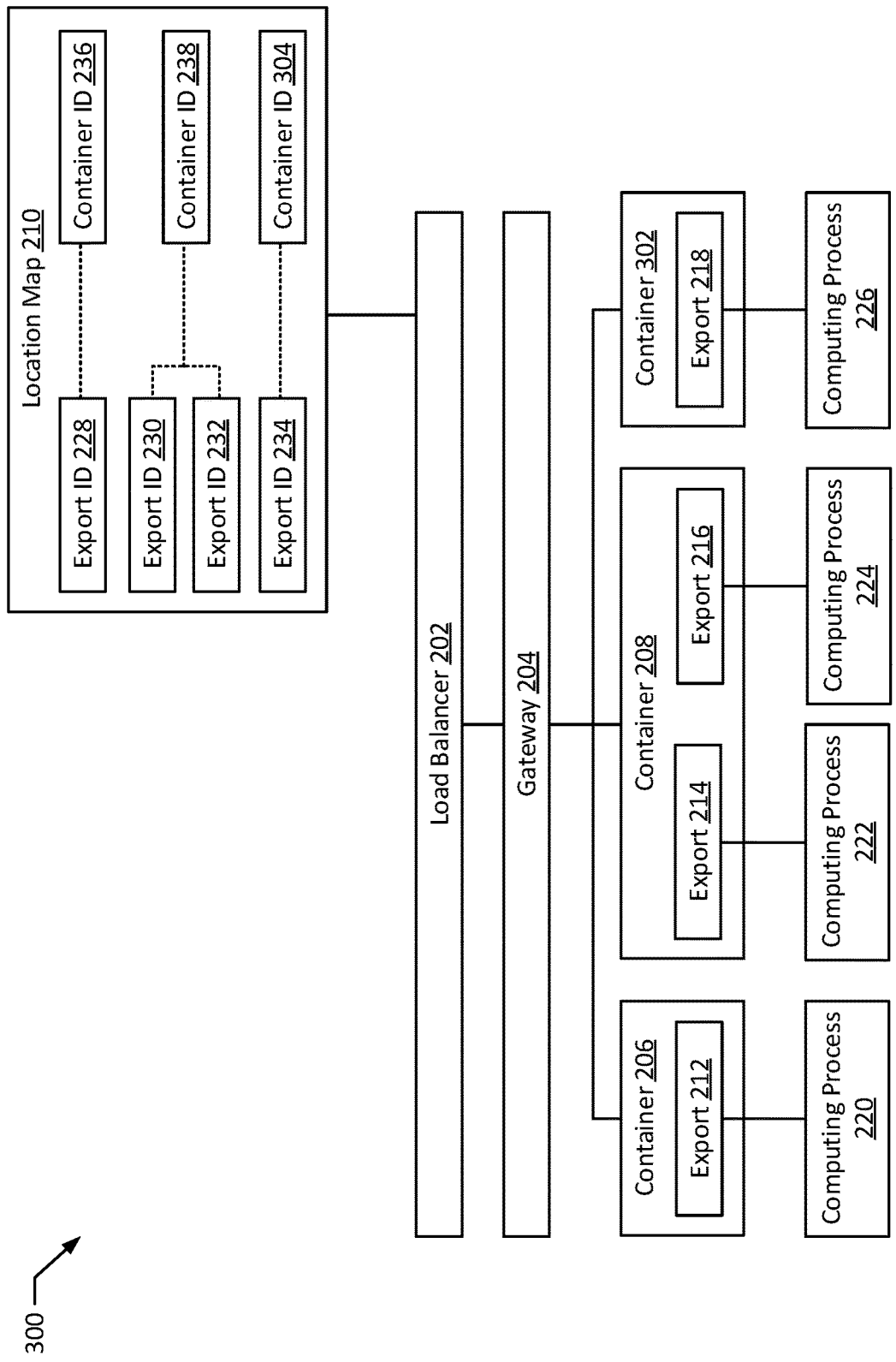
FIG. 3A-3B illustrate file system scaling scenarios according to an exemplary embodiment of the present disclosure.

As one specific example, and turning to FIG. 3A, the file system scaling scenario 300 depicts a scenario where the load balancer 202 has created a new containers 302 for the distributed file system 108. Over time, the number of requests to access each export 212, 214, 216, 218 may change. In certain instances, the differing request loads the exports 212, 214, 216, 218 may overload or otherwise cause a disproportionate number of requests to be fulfilled by a particular container 208. For example, initially, the requests to access the export 212 may be approximately equivalent to the combined requests to access the exports 214, 216, 218. However, at a later time, the requests to access the export 218 may be greater than the request to access the export 212. In such instances, the greater request load for the export 216 may utilize a large proportion of the computing resources allocated to the container 208, increasing the latency for requests to access exports 214, 216, 218 implemented by the container 208.

In response, the load balancer 202 may create a new container 302 associated with the gateway 204. For example, the load balancer 202 and/or the distributed file system 108 may request the cloud computing environment 102 to create a new container 302 and to assign computing resources (e.g., from the memory 132 and the processor 134) to implement the container 302. The load balancer 202 may then assign the export 218 of the gateway 204 to the container 302, such that the container 302 will respond to requests to access, add, and/or update data within a portion of the distributed file system 108 corresponding to the export 218. The location map 210 may then be updated (e.g., by the load balancer 202, by the distributed file system 108) to add a container identifier 304 associated with the container 302 (e.g., containing an address for the container 302) and reassign the export identifier 234 to the container identifier 304.

The next time the computing process 226 attempts to access the export 218, the computing process 226 may transmit a request to the container 208. In response, the container 208 may transmit an error message because the export 218 is no longer assigned to the container 208. In response to the error message, the computing process 226 may query the location map 210 for the container identifier 304. The computing process 226 may then receive the container identifier 304 and may transmit the request to the container 302 via the address specified in the container identifier 304. In this way, new containers 302 can be added to a gateway 204 of the distributed file system 108 without interrupting operation of the distributed file system 108.

It should be understood that the above scenario 300 is merely exemplary implementation. In practice, the load balancer 202 may respond to overloaded containers 208 in different ways. For example, more than one container 302 may be added to the gateway 204 (e.g., if multiple exports 216, 218 receiving disproportionately large request volumes). Additionally or alternatively, rather than creating a new container 302, the load balancer 202 may reassign and export 218 to a different container 206 that is not currently experiencing high request loads. In such scenarios, the location map 210 may still be updated with a container identifier 236 corresponding to the newly assigned container 206.

Returning to FIG. 2, the load balancer 202 may also be responsible for creating the gateways 204 that implement the distributed file system 108. For example, the load balancer 202 may be configured to create gateways 204 to implement the distributed file system 108 and to create and assign corresponding containers 206, 208 to implement the distributed file system 108. For example, the load balancer 202 may create new containers when requests are received for portions of the distributed file system 108 that have not been assigned to a particular gateway 204 and/or for requests received from computing processes executing on computing hardware located far from a computing device implementing a gateway assigned to manage requests for a particular portion of the distributed file system 108.

Figure 3B:
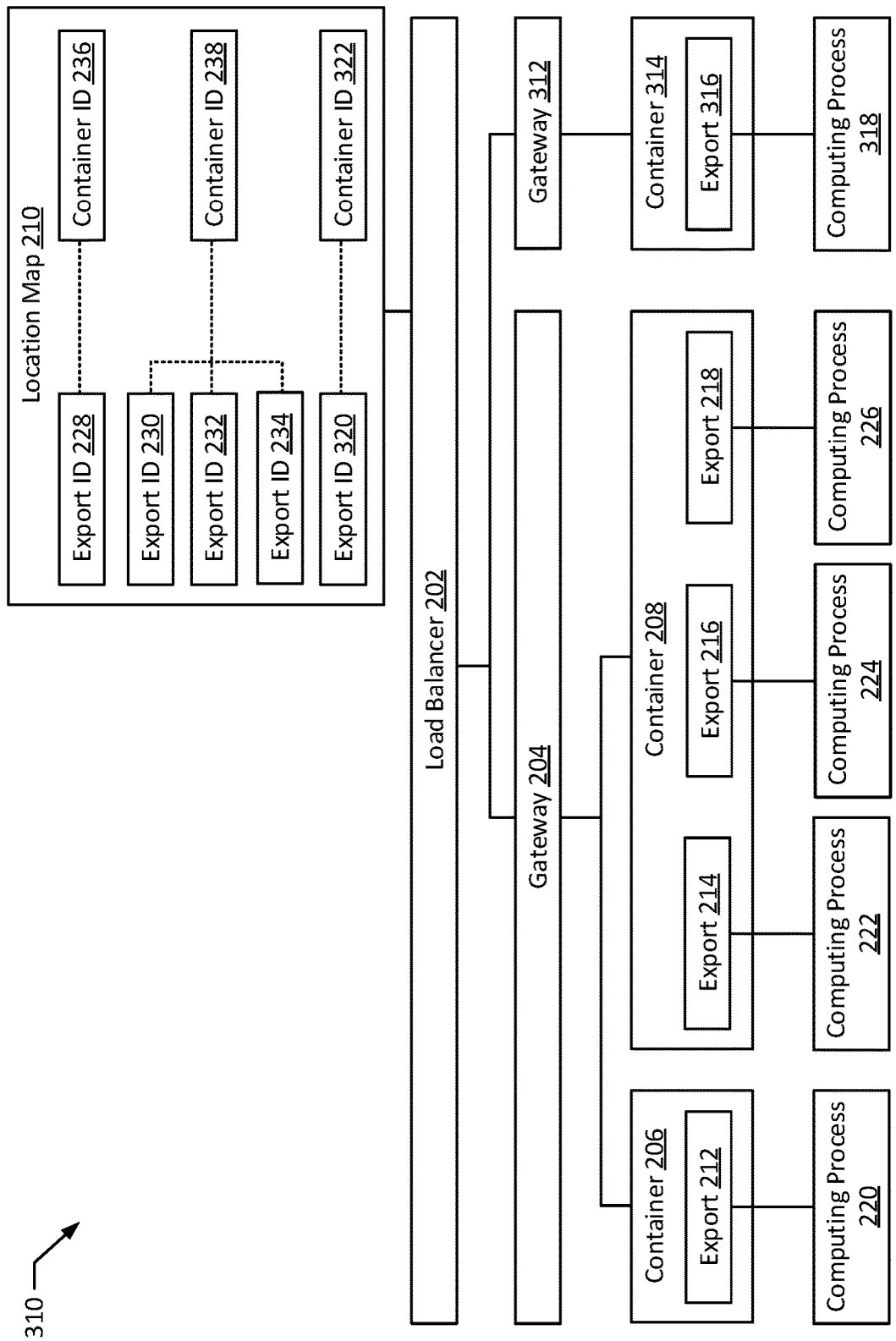

As one specific example, and turning to FIG. 3B, the file system scaling scenario 310 depicts a scenario where the load balancer 202 has created a new gateway 312 for the distributed file system 108. As explained above, requests may be received to access portions of the distributed file system 108 that have not been directly assigned to a particular gateway 204 of the distributed file system 108. As one example, a request may be received to access a first directory of the distributed file system 108. A parent directory for the first directory may be assigned to a particular gateway of the distributed file system 108, but the first directory itself may not be assigned to the particular gateway. In such instances, requests to access data stored within the first directory may generally be processed by one or more containers implementing the particular gateway. However, in certain instances, the request to access the first directory may be received from a computing process executing on a different portion of the cloud computing environment 102 (e.g., at a different the geographical location) from the computing devices implementing the containers of the particular gateway. Accordingly, requests to access the first directory may experience increased latency, reducing operating performance for the distributed file system 108.

In response to receiving such a request, the load balancer 202 may create a new gateway 312 for the distributed file system 108 and may assign the new gateway 312 to manage an export 316 corresponding to the first directory that has not been directly assigned to a particular gateway 204 of the distributed file system 108 previously. In particular, while creating the new gateway 312 for the distributed file system 108, the distributed file system 108 may create a new container 314 responsible for implementing the new gateway 312. For example, the load balancer 202 and/or the distributed file system 108 may request that the cloud computing environment 102 create the new container 314 and assign computing resources (e.g., from the memory 132 and the processor 134) to implement the container 314. In certain instances, the container 314 may be created on a computing device located near the computing process 318 from which the request to access the first directory was received. An export 316 associated with the first directory may then be assigned to the container 314. The location map 210 may also be updated by adding export identifier 320 associated with the export 316 and a container identifier 322 associated with the container 314 (e.g., containing an address for the container 314).

In response to the request, the computing process 318 may receive an error from the container to which the request was transmitted, indicating that the export 316 is not assigned to that container. The computing process 318 may query be location map 210 for the container identifier 322 associated with the export identifier 320. The computing process 318 may then receive the container identifier 322 and may transmit the request to the container 314 via the address specified in the container identifier 322. In this way, new gateways can be added to a distributed file system 108 without interrupting operation of the distributed file system 108.

It should be understood that the implementations discussed above in connection with FIGS. 2, 3A, and 3B are merely exemplary and that additional or alternative implementations may differ. For example, in certain implementations, the location map 210 may contain mappings between export identifiers and gateway identifiers (e.g., where all containers in a gateway cluster handle all exports of the gateway). The gateway identifiers may contain an address that can be used to communicate with the gateway cluster of containers. In such instances, adding a new container (e.g., as in FIG. 2A) may not require the location map 210 to be updated because the gateway identifier has not changed. In further instances, the gateway identifiers may contain container identifiers for containers within a corresponding gateway cluster. In such instances, adding a new container may require the location map 210 to be updated (e.g., to add a container identifier for the newly-added container).

Figure 4:
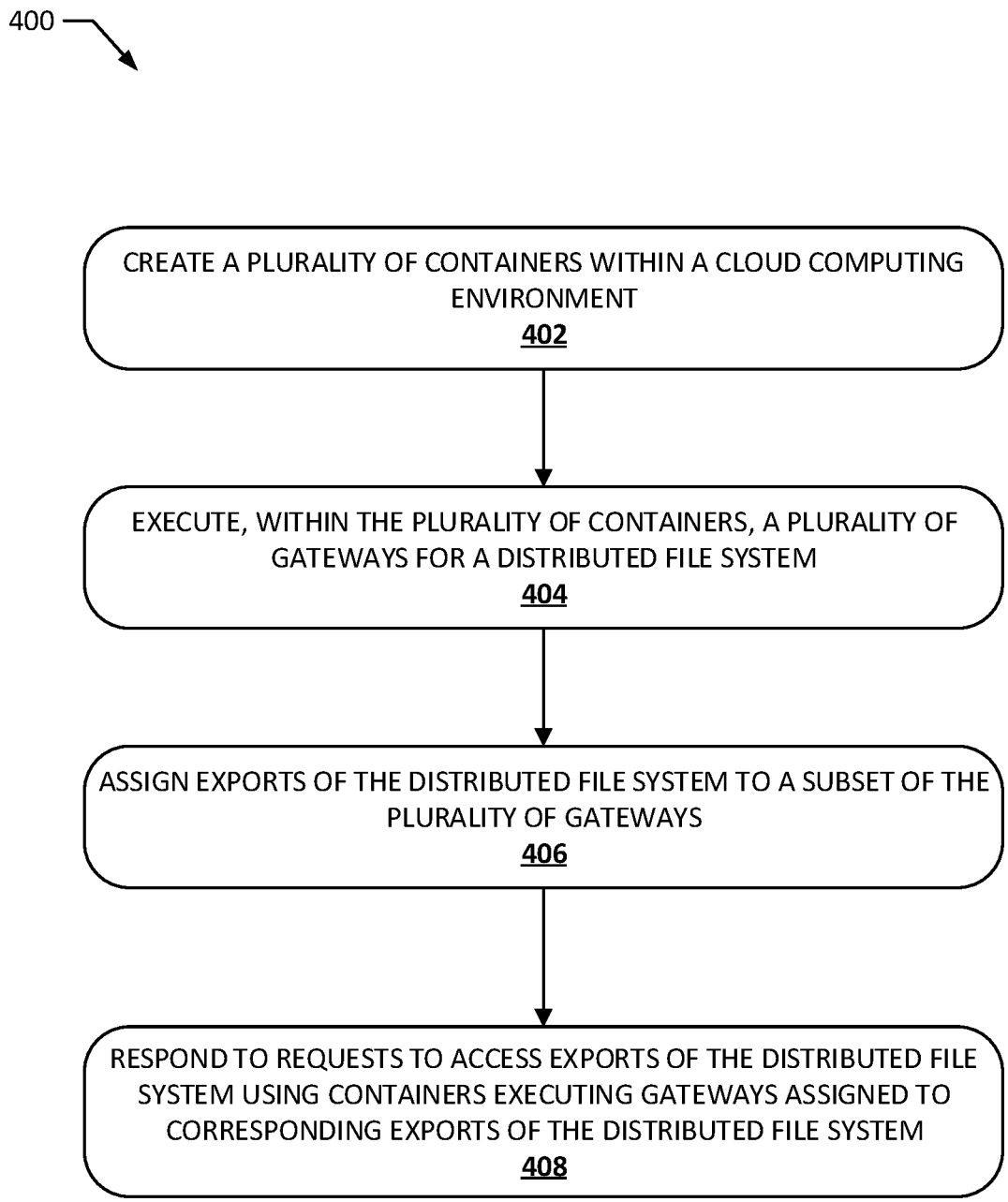
FIG. 4 illustrates a method for distributed file system management according to an exemplary embodiment of the present disclosure.

FIG. 4 illustrates a method 400 for distributed file system management according to an exemplary embodiment of the present disclosure. In particular, the method 400 may be performed to initialize a distributed file system 108 executing with gateways implemented by one or more containers of a cloud computing environment. The method 400 may be implemented on a computer system, such as the system 100. For example, the method 400 may be implemented by the cloud computing environment 102, the distributed file system 108, and/or the load balancer 110, 202. The method 400 may also be implemented by a set of instructions stored on a computer readable medium that, when executed by a processor, cause the computer system to perform the method 400. For example, all or part of the method 400 may be implemented by the processor 134 and the memory 132. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with creating a plurality of containers within a cloud computing environment (block 402). For example, a plurality of containers 120, 122, 124, 126, 128, 130, 206, 208, 302, 314 may be created within a cloud computing environment 102. The containers 120, 122, 124, 126, 128, 130, 206, 208, 302, 314 may be created in a response to implement a distributed file system 108. For example, a request may be received to initialize a distributed file system 108 (e.g., from a computing process executing on the cloud computing environment 102). Additionally or alternatively, a request may be received to begin executing a computing process that identifies the distributed file system 108 as a dependency for the computing process, and the containers 120, 122, 124, 126, 128, 130, 206, 208, 302, 314 may be created in response to identifying the dependency. The containers 120, 122, 124, 126, 128, 130, 206, 208, 302, 314 may be created by the cloud computing environment 102 and/or may be created by a load balancer 110, 202 associated with the distributed file system 108.

A plurality of gateways for the distributed file system may be executed within the plurality of containers (block 404). For example, a plurality of gateways 114, 116, 118, 204, 312 for the distributed file system 108 may execute within the plurality of containers 120, 122, 124, 126, 128, 130 206, 208, 302, 314. In particular, each gateway 114, 116, 118, 204, 312 for the distributed file system 108 may be implemented by one or more containers 120, 122, 124, 126, 128, 130. Container identifiers 236, 238, 304, 322 for containers 120, 122, 124, 126, 128, 130, 206, 208, 302, 314 assigned to implement particular gateways 114, 116, 118, 204, 312 of the distributed file system 108 may be added to a location map 210 associated with the distributed file system 108.

Exports of the distributed file system may be assigned to a subset of the plurality of gateways (block 406). For example, at least a subset of the gateways 114, 116, 118, 204, 312 may be responsible for responding to requests to access, add, or update data stored within particular, exclusive subsets of the distributed file system 108. In particular, exports 212, 214, 216, 218, 316 corresponding to exclusive subsets of the distributed file system 108 may be assigned to the gateways 114, 116, 118. In one example, all exports assigned to a particular gateway 114, 116, 118, 204, 312 may be assigned to each of the containers 120, 122, 124, 126, 128, 130, 206, 208, 302, 314 implementing the gateways 114, 116, 118, 204, 312. In another example, particular exports 212, 214, 216, 218, 316 may be assigned to individual containers 120, 122, 124, 126, 128, 130, 206, 208, 302, 314 implementing the gateways 114, 116, 118, 204. The exports 212, 214, 216, 218, 316 may be assigned to the containers 120, 122, 124, 126, 128, 130, 206, 208, 302, 314 based on various considerations. For example, the exports 212, 214, 216, 218, 316 may be assigned according to a previous implementation configuration for the distributed file system 108 (e.g., the configuration the last time the distributed file system 108 was implemented). Additionally or alternatively, the exports 212, 214, 216, 218, 316 may be assigned based on the computing process whose request triggered initialization of the distributed file system 108. In still further implementations, the distributed file system 108 may be initialized with a single container implementing a single gateway, and additional containers and/or gateways may be added to the distributed file system 108 using techniques similar to those discussed herein in connection with the scenarios 300, 310 and the methods 500, 510. The location table 112, 210 may be updated based on how the exports 212, 214, 216, 218, 316 are assigned to the gateways 114, 116, 118, 204, 312. For example, the location map 112, 210 may be updated to include export identifiers 228, 230, 232, 234, 320 corresponding to the assigned exports 212, 214, 216, 218, 316. In particular, the export identifiers 228, 230, 232, 234, 320 may be added to the location map 112, 210 in association with gateway identifier of an assigned gateway 114, 116, 118, 204, 312 and/or a container identifier 236, 238, 304, 322 of an assigned container 120, 122, 124, 126, 128, 130, 206, 208, 302, 314.

Requests to access exports of the distributed file system may be responded to using containers executing gateways assigned to corresponding exports of the distributed file system (block 408). For example, the distributed file system 108 may respond to requests from computing processes 220, 222, 224, 226, 318 to access particular portions (e.g., particular exports, particular subtrees, particular subdirectories) of the distributed file system 108 using containers 120, 122, 124, 126, 128, 130, 206, 208, 302, 314 that implement corresponding exports 212, 214, 216, 218, 316. In particular, as explained above, before requesting access to the distributed file system 108, computing processes 220, 222, 224, 226, 318 may request a gateway identifier for a corresponding gateway 114, 116, 118, 204, 312 and/or a container identifier 236, 238, 304, 322 for a corresponding container 120, 122, 124, 126, 128, 130, 206, 208, 302, 314 implementing an export 212, 214, 216, 218, 316 used to access the desired subdirectory or subtree of the distributed file system 108. The gateway identifier and/or the container identifier 236, 238, 304, 322 may identify an address that may be used to communicate with the corresponding gateway 114, 116, 118, 204, 312 (e.g., gateway cluster) and/or container 120, 122, 124, 126, 128, 130, 206, 208, 302, 314. The computing processes 220, 222, 224, 226, 318 may then transmit a request to the specified address in order to access the distributed file system 108. In response, the containers 120, 122, 124, 126, 128, 130, 206, 208, 302, 314 may process the request, providing access to corresponding portions of the distributed file system (e.g., by providing copies of data within the distributed file system 108, by updating data stored within the distributed file system 108, and/or by adding data to the distributed file system 108).

In this way, the method 400 enables the provisioning of a distributed file system within a cloud computing environment using one or more containers to implement gateways for the distributed file system. Implementing distributed file systems using multiple containers improves the flexibility of how the distributed file systems are deployed. Containerized implementations of distributed file systems and associated gateways may also improve the security of access requests to the distributed file system. For example, the distributed file system may be implemented as part of a cloud computing environment that executes many computing processes associated with multiple users (e.g., multiple entities). The distributed file system may store sensitive or confidential data that should only be accessed by the entity that requested it be implemented. Accordingly, to protect such access, the containers that implement the distributed file system may be configured to only respond to requests that are received from other containers associated with the same entity. For example, a container that receives a request from a particular computing process may analyze metadata associated with a container implementing the computing process. If the metadata indicates that the container implementing the computing process is associated with the same entity as the container implementing the gateway of the distributed file system, the container may proceed with processing the request. If not, the container may determine that the request is unauthorized and may halt processing of the request and/or may transmit an error message (e.g., to an administrator of the cloud computing environment, to the entity associated with the container). In this way, containerized implementations of distributed file systems may ensure that the distributed file system is only accessed by authorized users and authorized computing processes.

Furthermore, and as discussed further below, container-based implementations enable both vertical scaling, where additional gateways can be added to the distributed file system without interrupting access to the distributed file system, and horizontal scaling, where additional containers and computing resources can be added to implement a particular gateway without interrupting access to the distributed file system. Accordingly, such distributed file systems are better able to scale and reallocate resources to respond to changing demand across various exports of the distributed file system. This may help reduce overall computing resource utilization and/or reduce response latency.

Figure 5:
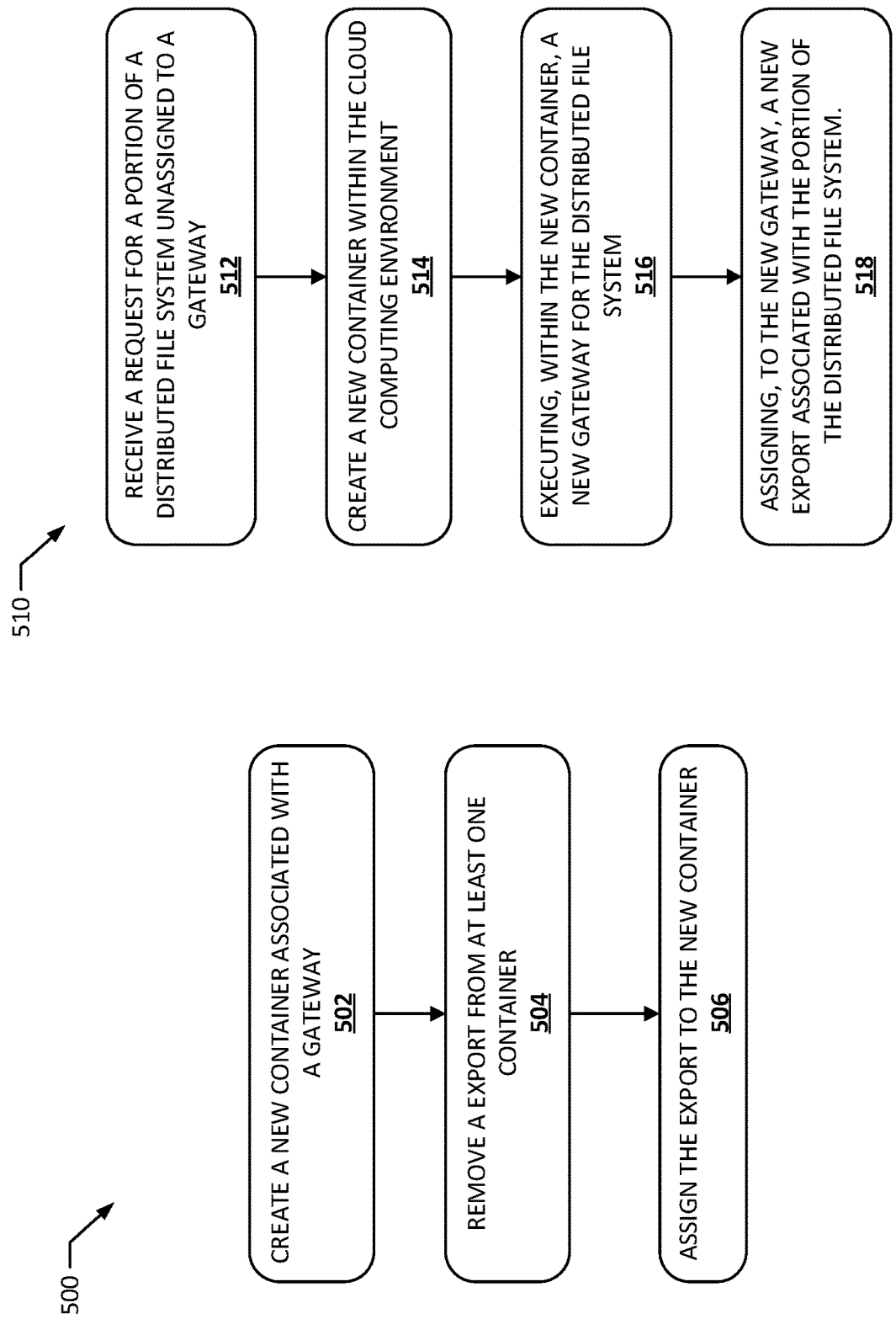
FIGS. 5A-5B illustrate methods for distributed file system management according to an exemplary embodiment of the present disclosure.

FIGS. 5A-5B illustrate methods 500, 510 for distributed file system management according to an exemplary embodiment of the present disclosure. In particular, the method 500 be performed to add a new container to an existing gateway for a distributed file system executing within a cloud computing environment (e.g., to horizontally scale a distributed file system). The method 510 may be performed to add a new gateway to a distributed file system executing within a cloud computing environment (e.g., to vertically scale a distributed file system). The methods 500, 510 may be implemented on a computer system, such as the system 100. For example, the methods 500, 510 may be implemented by the cloud computing environment 102, the distributed file system 108, and/or the load balancer 110, 202. The methods 500, 510 may also be implemented by a set of instructions stored on a computer readable medium that, when executed by a processor, cause the computer system to perform the methods 500, 510. For example, all or part of the methods 500, 510 may be implemented by the processor 134 and the memory 132. Although the examples below are described with reference to the flowchart illustrated in FIGS. 5A-5B, many other methods of performing the acts associated with FIGS. 5A-5B may be used. For example, the order of some of the blocks may be changed, certain blocks may be combined with other blocks, one or more of the blocks may be repeated, and some of the blocks described may be optional.

To horizontally scale a distributed file system, the method 500 may begin with creating a new container associated with a first gateway (block 502). For example, a load balancer 110, 202 of the distributed file system 108 may determine that a request volume for at least one of the containers 120, 122, 124, 126, 128, 130, 206, 208, 302, 314 implementing the distributed file system 108 exceeds a predetermined threshold. The predetermined threshold may include a total number of requests received in a predetermined period of time (e.g., requests per second, requests per minute) exceeding a predetermined number (e.g., 1000 requests per second, 10,000 requests per second, 100,000 requests per second). The predetermined threshold may additionally or alternatively include the container receiving a percentage of the total requests received for the distributed file system 108 exceeding a predetermined threshold (e.g., 5% of the requests, 10% of the requests, 25% of the requests, 50% of the requests). Additionally or alternatively, the predetermined threshold may include a percentage of requests received by a particular container 120, 122, 124, 126, 128, 130, 206, 208, 302, 314 received for a particular export 212, 214, 216, 218, 316 exceeding a predetermined threshold (e.g., 10% of the requests received by the container, 25% of the requests received by the container, 50% of the requests received by the container, 75% of the requests received by the container). In still further implementations, the predetermined threshold may include one or more performance metrics for the container 120, 122, 124, 126, 128, 130, 206, 208, 302, 314. For example, the predetermined threshold may include one or more of a request response latency for the container 120, 122, 124, 126, 128, 130, 206, 208, 302, 314 and/or a total computing resource utilization (e.g., number of CPU cores, percentage of memory capacity) utilized by the container 120, 122, 124, 126, 128, 130, 206, 208, 302, 314. In response to determining that a predetermined threshold has been exceeded, the balancer 110, 202 may proceed with creating a new container. In one specific example, the load balancer 202 may determine that a request response latency for the container 208 exceeds a predetermined threshold (e.g., 50 ms, 100 ms). In response, the load balancer 202 may create a new container 302 associated with the same gateway 204 as the container 208.

An export may be removed from at least one container (block 504). For example, the load balancer 202 may remove an export 218 from the container 208 associated with the gateway 204. The container 208 may be identified as the container whose request volume and/or performance metrics exceed a predetermined threshold. Additionally or alternatively, we container 208 may be identified as the container with the highest request load. The export 218 removed from the container 208 may be selected as the export 218 with the highest request load. Additionally or alternatively, the exports 218 may be selected such that a predicted request load for the container 208 in the container 302 (e.g., predicted based on recent request loads for the exports 214, 216, 218 originally implemented by the container 208) is approximately equal. For example, the export 218 may have approximately the same number of requests as the exports 214, 216 combined. Accordingly, the export 218 may be selected. In additional or alternative implementations, the load balancer 202 may select more than one export to remove the container 208. For example, in additional alternative implementations, the load balancer 202 may select to remove the exports 214, 216 from the container 208 instead of the exports 218. In removing the export 218 from the container 208, the load balancer 202 and/or the distributed file system 108 may update the location map 210 for the distributed file system 108. For example, the location map 210 may be updated to remove an association between an export identifier 234 associated with the export 218 and a container identifier 238 associated with the container 208.

The exports may be assigned to the new container (block 506). For example, the export 218 may be assigned to the new container 302. In particular, the load balancer 202 may transmit an indication to the container 302 of the exports 218, including a copy and/or a reference of the subset of the distributed file system 108 to be serviced by the container 302. Additionally, the location map 210 may be updated to include an association between the export identifier 234 associated with the export 218 and a container identifier 304 associated with the container 302.

Turning now to FIG. 5B, to vertically scale a distributed file system, the method 510 may begin with receiving a request for a first portion of a distributed file system unassigned to a gateway (block 512). For example, a request may be received from a computing process 318 to access a subtree or subdirectory of the distributed file system is not previously been assigned to a particular gateway 204 of the distributed file system 108. As explained further above, the unassigned portion of the distributed file system may include a portion of the distributed file system 108 that is not been directly assigned and/or a portion of the distributed file system 108 whose parent is been assigned to a gateway implemented by a computing device that is located greater than a predetermined distance from a computing device implementing the computing process 318.

A new container may be created within the cloud computing environment (block 514). For example, a new container 314 may be created within the cloud computing environment 102 implementing the distributed file system 108. The new container 314 may be implemented using techniques similar to those discussed above in connection with block 502 of the method 500. In certain instances, the new container 314 may be implemented on the same computing device as the computing process 318. In additional or alternative implementations, the container 314 may be implemented on a computing device located near the computing device implementing the computing process 318.

A new gateway may be executed within the new container for the distributed file system (block 516). For example, a new gateway 312 may be executed within the new container 314. The new gateway 312 may be configured to route and respond to requests to access portions of the distributed file system 108.

A new export associated with the unassigned portion of the distributed file system may be assigned to the new gateway (block 518). For example, a new export 316 may be assigned to the new gateway 312. In particular, the new export 316 may be assigned to the new container 314 implementing the gateway 312 such that requests to access data associated with the export 316 are processed and responded to by the container 314. In particular, the export 316 may be associated with the unassigned portion of the distributed file system 108 identified in the request received by the computing process 318. Assigning the new export 316 to the new container 314 and the new gateway 312 may include updating the location map 210. In particular, the location map 210 may be updated to include an association between an export identifier 320 associated with the new export 316 and a container identifier 322 associated with the new container 314. As explained further above, in response to the initial request, the computing process 318 may receive an error message indicating that the requested portion of the distributed file system 108 has not been assigned to a particular subtree. In response, the computing process 318 may query the location map 210 for the assigned container. In response, the computing process 318 may receive the container identifier 322, which may be used to directly request access to the export 316 from the container 314. In additional or alternative implementations, in response to the initial request, the load balancer 202 and/or the location map 210 may provide the container identifier 322.

In the above examples, the methods 500, 510 are performed to add gateways and/or containers to a particular distributed file system. In practice, load balancers may also be configured to remove and/or consolidate containers and gateways implementing the distributed file system. In such instances, the containers and/or gateways may be removed or consolidated by performing one or more steps of the methods 500, 510 in reverse. For example, removing a container from a particular gateway may include removing the exports assigned to the container, removing the container from the cloud computing environment 102, and assigning the exports to another container or deleting the exports such that requests for the associated portions of the distributed file system are handled based on exports corresponding to parent directories.

In this way, the methods 500, 510 may enable vertical and/or horizontal scaling of the gateways and containers that implement a distributed file system. Such scaling allows for the computing resources allocated to responding to requests for particular exports to be responsively adjusted based on actual request volumes received for the exports. Furthermore, by adding gateways and/or containers located near associated computing processes, the methods 500, 510 may help improve response latency and reduce network congestion, as the number of requests over long distances across a network is reduced. In still further implementations, overall computing resource utilization may decrease, as computing resources assigned to containers implementing minimally-requested exports are reduced. Relatedly, response latency may improve, as greater computing resources are assigned to exports with high request loads.

Figure 6:
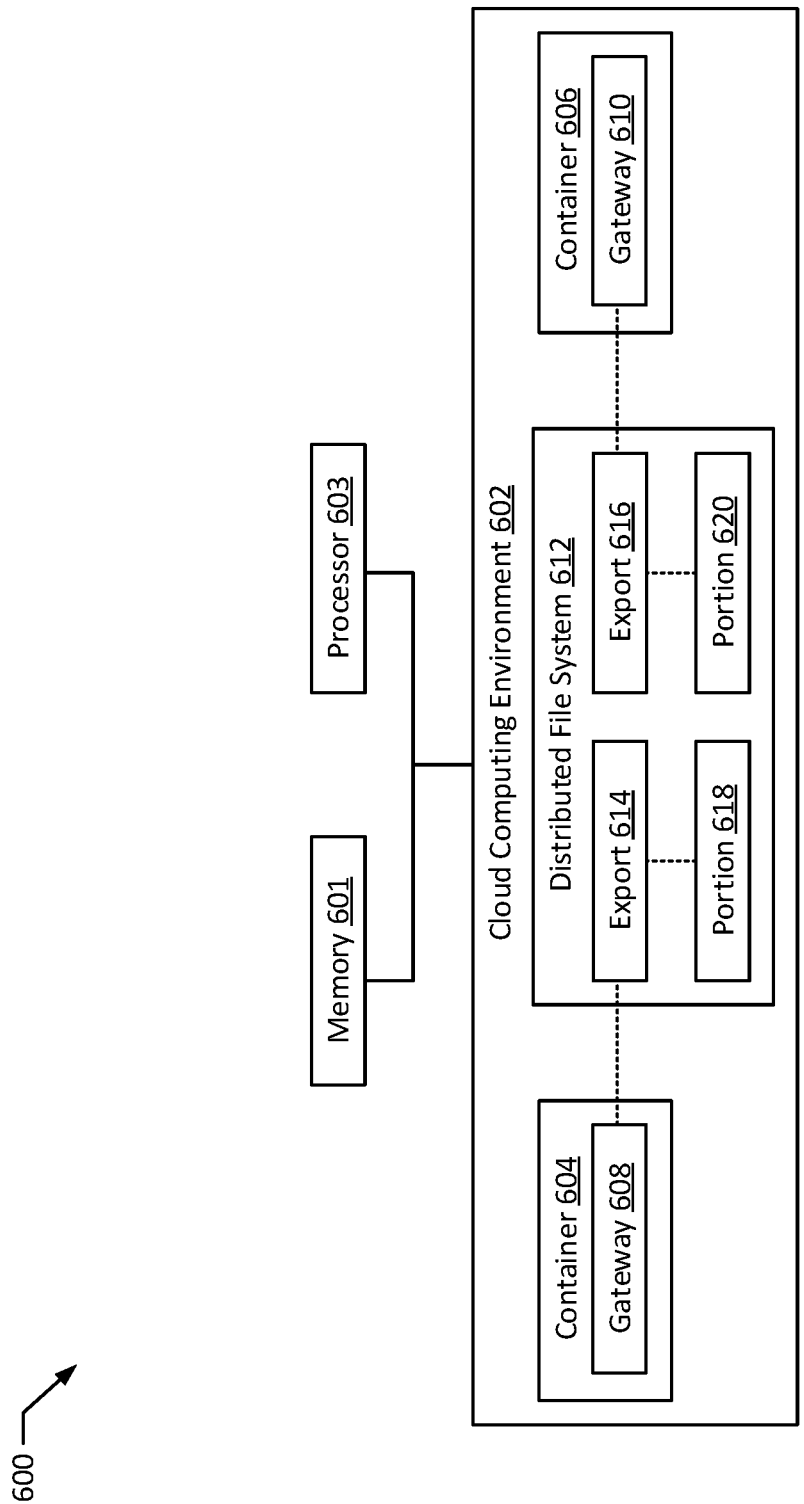
FIG. 6 illustrates a system according to an exemplary embodiment of the present disclosure.

FIG. 6 illustrates a system 600 according to an exemplary embodiment of the present disclosure. The system 600 includes at least one processor 601 and at least one memory 603 configured to implement a cloud computing environment 602 and a plurality of containers 604, 606 executing within the cloud computing environment 602. The system 600 may also include a plurality of gateways 608, 610 for a distributed file system 612 executing within the plurality of containers 604, 606. At least a subset of the plurality of containers 604, 606 may be assigned to exports 614, 616 of the distributed file system 612, the exports 614, 616 corresponding to an exclusive subset of the distributed file system 612. Requests to access particular portions 618, 620 of the distributed file system 612 are responded to using the containers 604, 606 executing gateways 608, 610 assigned to corresponding exports 614, 616 of the distributed file system 612.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
creating a plurality of containers within a cloud computing environment;
executing, within the plurality of containers, a plurality of gateways for a distributed file system;
assigning exports of the distributed file system to a subset of the plurality of gateways, wherein the exports correspond to an exclusive subset of the distributed file system;
responding to requests to access exports of the distributed file system using containers executing gateways assigned to corresponding exports of the distributed file system;
receiving a request for a first portion of the distributed file system, wherein the first portion of the distributed file system is unassigned to a gateway;
in response to receiving the request, creating a new container within the cloud computing environment;
executing, within the new container, a new gateway for the distributed file system; and
assigning, to the new gateway, a new export associated with the first portion of the distributed file system.

2. The method of claim 1, wherein the distributed file system is a Network File System and the plurality of gateways are NFS gateways.

3. The method of claim 1, wherein the exports are subtrees of the distributed file system.

4. The method of claim 1, wherein a first gateway of the plurality of gateways is executed by multiple containers of the plurality of containers.

5. The method of claim 4, wherein each of the multiple containers is assigned to different exports assigned to the first gateway.

6. The method of claim 4, wherein each of the multiple containers is assigned to all of the exports assigned to the first gateway.

7. The method of claim 4, further comprising:
creating a new container associated with the first gateway;
removing a first export of the distributed file system from at least one container of the multiple containers; and
assigning the first export to the new container.

8. The method of claim 7, wherein the new container is created in response to determining that a request volume for the at least one container exceeds a predetermined threshold.

9. The method of claim 8, wherein the predetermined threshold includes one or more of a volume of requests received by the at least one container and/or a percentage of total requests for the first gateway received by the at least one container.

10. The method of claim 8, wherein the predetermined threshold includes at least one of a total computing resource utilization by the at least one container and/or a request response latency for the at least one container.

11. The method of claim 1, wherein assigning the new export includes updating a location map associated with the distributed file system.

12. The method of claim 1, wherein the distributed file system is associated with a first entity utilizing the cloud computing environment and the plurality of containers are inaccessible by containers associated with other entities utilizing the cloud computing environment.

13. The method of claim 1, wherein the first portion of the distributed file system is a directory of the distributed file system and the new export contains the directory and all contents of the directory that are unassigned to a gateway.

14. A system comprising:
a processor; and
a memory storing instructions which, when executed by the processor, cause the processor to:
create a plurality of containers within a cloud computing environment;
execute, within the plurality of containers, a plurality of gateways for a distributed file system;
assign exports of the distributed file system to a subset of the plurality of gateways, wherein the exports correspond to an exclusive subset of the distributed file system;
respond to requests to access exports of the distributed file system using containers executing gateways assigned to corresponding exports of the distributed file system;
receive a request for a first portion of the distributed file system, wherein the first portion of the distributed file system is unassigned to a gateway;
in response to receiving the request, create a new container within the cloud computing environment;
execute, within the new container, a new gateway for the distributed file system; and
assign, to the new gateway, a new export associated with the first portion of the distributed file system.

15. The system of claim 14, wherein the predetermined threshold includes one or more of a volume of requests received by the at least one container and/or a percentage of total requests for the first gateway received by the at least one container.

16. The system of claim 14, wherein the system is further configured to:
receive a request for a first portion of the distributed file system unassigned to a gateway;
create a new container within the cloud computing environment;
execute, within the new container, a new gateway for the distributed file system; and
assign, to the new gateway, a new export associated with the first portion of the distributed file system.

17. The system of claim 14, wherein each of the multiple containers is assigned to different exports assigned to the first gateway.

18. The system of claim 14, wherein each of the multiple containers is assigned to all of the exports assigned to the first gateway.

19. The system of claim 14, wherein the predetermined threshold includes at least one of a total computing resource utilization by the at least one container and/or a request response latency for the at least one container.

20. A non-transitory, computer-readable medium storing instructions which, when executed by a processor, cause the processor to:
create a plurality of containers within a cloud computing environment;
execute, within the plurality of containers, a plurality of gateways for a distributed file system;
assign exports of the distributed file system to a subset of the plurality of gateways, wherein the exports correspond to an exclusive subset of the distributed file system;
respond to requests to access exports of the distributed file system using containers executing gateways assigned to corresponding exports of the distributed file system;
receive a request for a first portion of the distributed file system, wherein the first portion of the distributed file system is unassigned to a gateway;

in response to receiving the request, create a new container within the cloud computing environment;
execute, within the new container, a new gateway for the distributed file system; and assign, to the new gateway, a new export associated with the first portion of the distributed file system.

\* \* \* \* \*